July 10, 1928.
P. J. GROENENSTEIN
1,676,896
GLARE SHIELD
Filed March 11, 1926
2 Sheets-Sheet 1
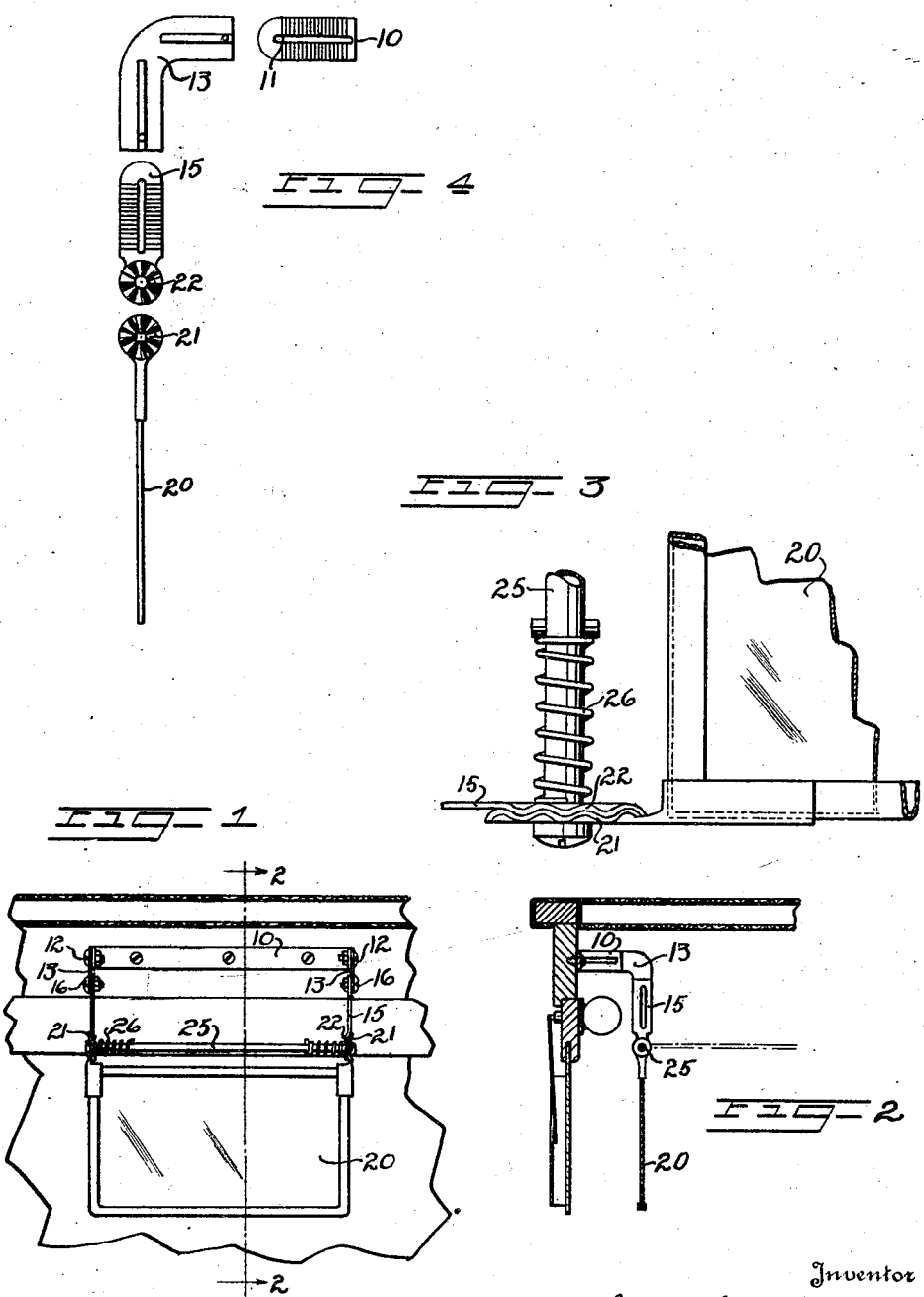

July 10, 1928.
P. J. GROENENSTEIN
GLARE SHIELD
Filed March 11, 1926
1,676,896
2 Sheets-Sheet 2
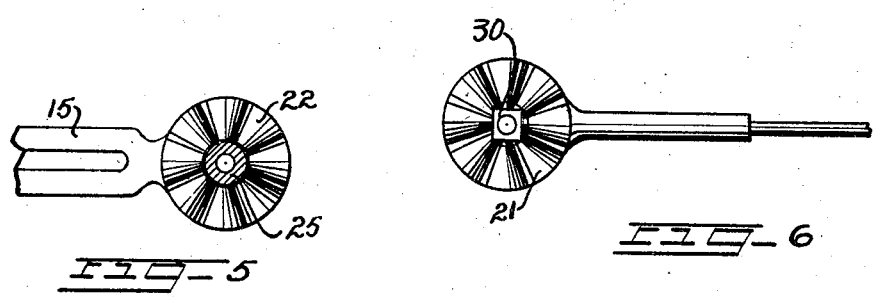
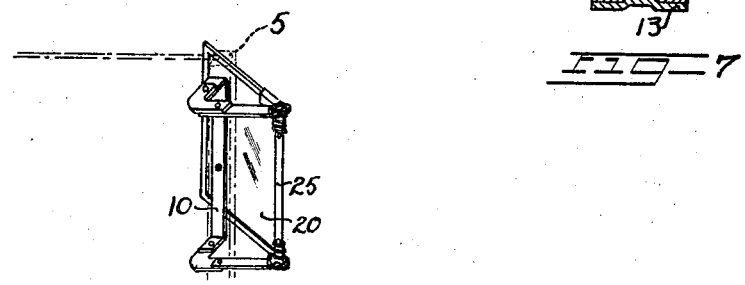
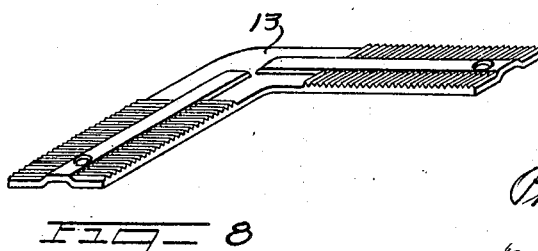
Inventor
Philip J. Groenenstein
By Bates Macklin Gohrick & Pease
Attorneys Patented July 10, 1928.

1,676,896

UNITED STATES PATENT OFFICE.

PHILIP J. GROENENSTEIN, OF CLEVELAND, OHIO.

GLARE SHIELD.

Application filed March 11, 1926. Serial No. 93,854.

This invention relates to glare shields which are adapted for use on automobiles and has particular reference to improvement of a shield which is illustrated, described and claimed in my copending application, Serial No. 6,943, filed February 2, 1925.

The present application is directed towards improvements, particularly in the manner of mounting the shield upon the frame of a windshield or upon the canopy of a car, and to provide sufficient clearance for articles which are usually mounted upon the upper portion of a windshield frame, such as a cleaner or mirror.

A further object of the present invention is to provide a shield having a rigid construction which enables the visor to be moved quickly into operative position without placing excessive stresses upon the frame of the shield.

The preferred means for carrying out my invention is illustrated in the drawings wherein Fig. 1 is a front elevation of a glare shield embodying my invention and mounted upon the canopy frame of a motor vehicle: Fig. 2 is a vertical section taken through the shield on a plane indicated by the line 2—2 in Fig. 1; Fig. 3 is a view adjacent one corner of the visor showing a detail of construction; Fig. 4 is a view of the shield with the cooperating parts spaced from each other; Figs. 5 and 6 are views taken on an enlarged scale and illustrating the corrugated coacting members by means of which the visor may be held in adjusted position; Fig. 7 is a section taken through the coacting bracket arm and link; Fig. 8 is a perspective view of one of the frame members; Fig. 9 is a perspective view showing the use of the shield as a side wind deflector.

My invention as shown is adapted for attachment either to a windshield frame, or to the frame of a vehicle top, and to this end I have indicated a shield frame embodying a plurality of parts, one of which may be called the base or bracket 10, is arranged to be attached to part of the vehicle. This base portion is illustrated as a U-shaped member, the arms of which are slotted, as at 11, to provide guideways for securing members 12. The intermediate portion of the base is adapted to be attached in any convenient manner to part of the vehicle. The remaining parts of the frame embody connecting links 13, which are preferably L-shaped members each having one end thereof attached to the base, and having the other end thereof attached to slides 15, as by the securing members 16. Thus the shield frame embodies links which provide adjustment for the visor in one plane, and cooperating slides which provide for adjustment in another plane at substantially right angles to the first mentioned plane.

The visor, indicated at 20, may be operatively connected to the frame by plates or ears 21, which are attached to the vistor and which are radially corrugated, and are adapted to engage complementary corrugated plates 22 associated with the slides 15. In the preferred form, a bar 25 extends between the corrugated plates, and has springs 26 mounted thereon for normally urging the corrugated plates into engagement with each other.

To permit the visor to be raised or lowered readily, and at the same time to distribute the raising and lowering stresses equally to the frame, I prefer to make the bar 25 rigid with the visor and, therefore, rotatable within the slides 15. To this end I have shown the bar as being non-circular, as at 30, adjacent each end thereof, which non-circular portion fits snugly within complementary shaped openings in the corrugated plates 21. Circular openings in the plates 22 enable the bar to be readily rotated whenever the visor is turned.

In Fig. 9 I have shown my shield as attached to the vertical frame member 5 of a motor vehicle. When thus mounted the visor may be swung to any desired position and may function as a side wind deflector.

A shield made in accordance with the present invention is advantageous in that ample clearance is obtained for enabling the shield frame to be readily attached without interfering with any existing articles, such as a cleaner or mirror, which may be attached to the windshield frame. Moreover, the present invention permits adjustment in either a vertical or a horizontal plane and enables the adjustment to be readily accomplished by means of a simple apparatus which may be easily and cheaply made almost entirely of stampings.

Having thus described my invention, I claim:

1. In combination, a glare shield frame embodying a U-shaped member which is adapted to be attached to a vehicle, L-shaped links, each having one end thereof slidably engaging an arm of said bracket, and visor supporting members slidably engaging the other end of said links.

2. In a device of the character described, the combination with a bracket adapted to be attached to a vehicle, of a visor, two visor supporting members spaced from the bracket and attached to opposite ends of the visor, and a pair of L-shaped intermediate connecting members between the bracket and the first mentioned members, there being pin and slot connections between the second named members and bracket for enabling the visor to be adjusted in horizontal and vertical planes.

3. A glare shield comprising in combination, a rectangular visor, a supporting bracket therefor, two pairs of links connecting the bracket to each end of the visor, one pair of said links comprising L-shaped members having pin and slot connections with the other of said pair of links, and with the bracket respectively.

4. In combination, a glare shield support, a visor, a pair of links connecting the visor and support, each of said links having slots therein extending at right angles to each other, means operating in said slots for enabling the visor to be moved in horizontal and vertical planes with reference to the support, and other means for connecting the visor to the links for permitting the visor to be swung about an axis with reference to the support.

In testimony whereof, I hereunto affix my signature.

PHILIP J. GROENENSTEIN.